UNITED STATES PATENT OFFICE.

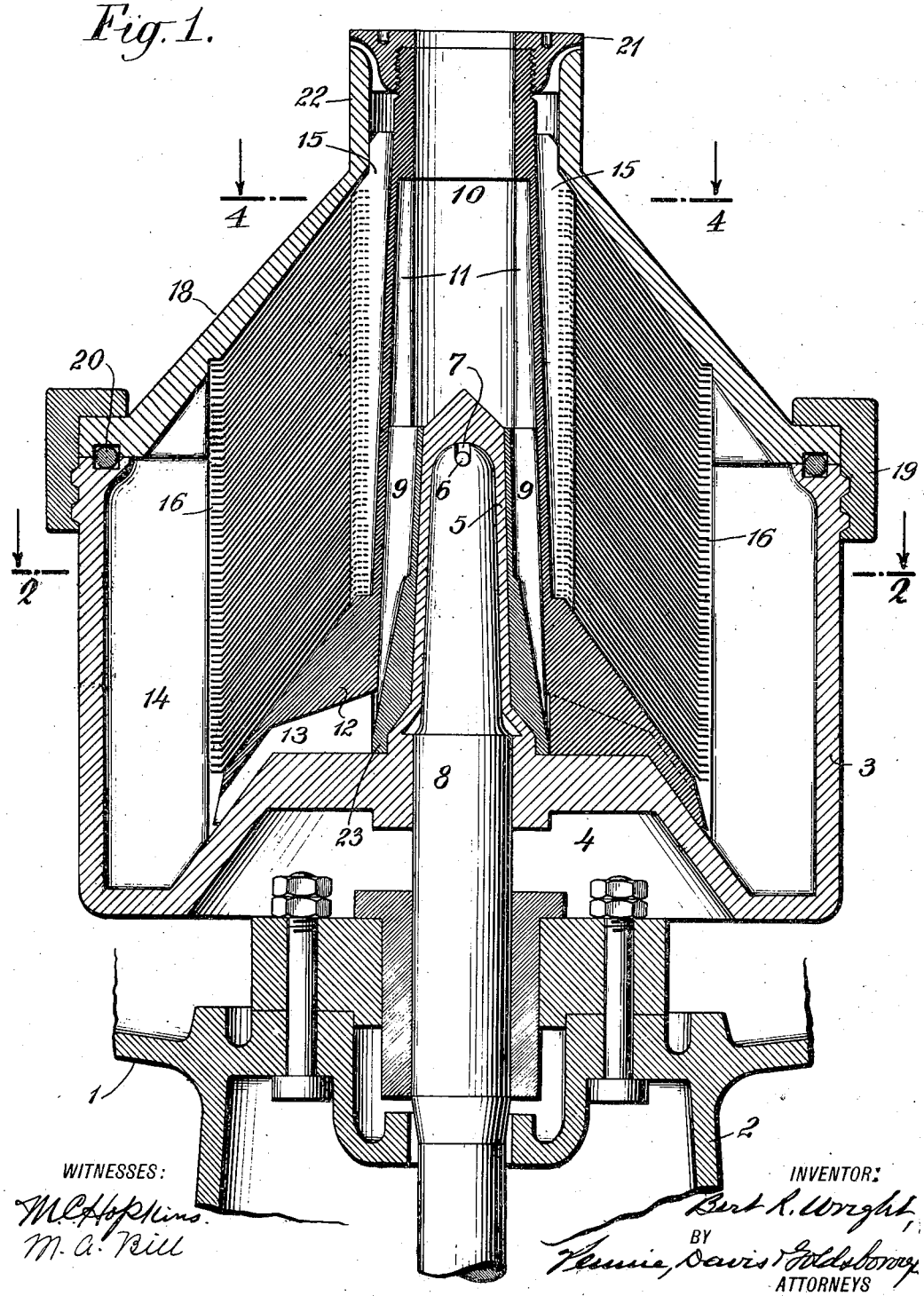

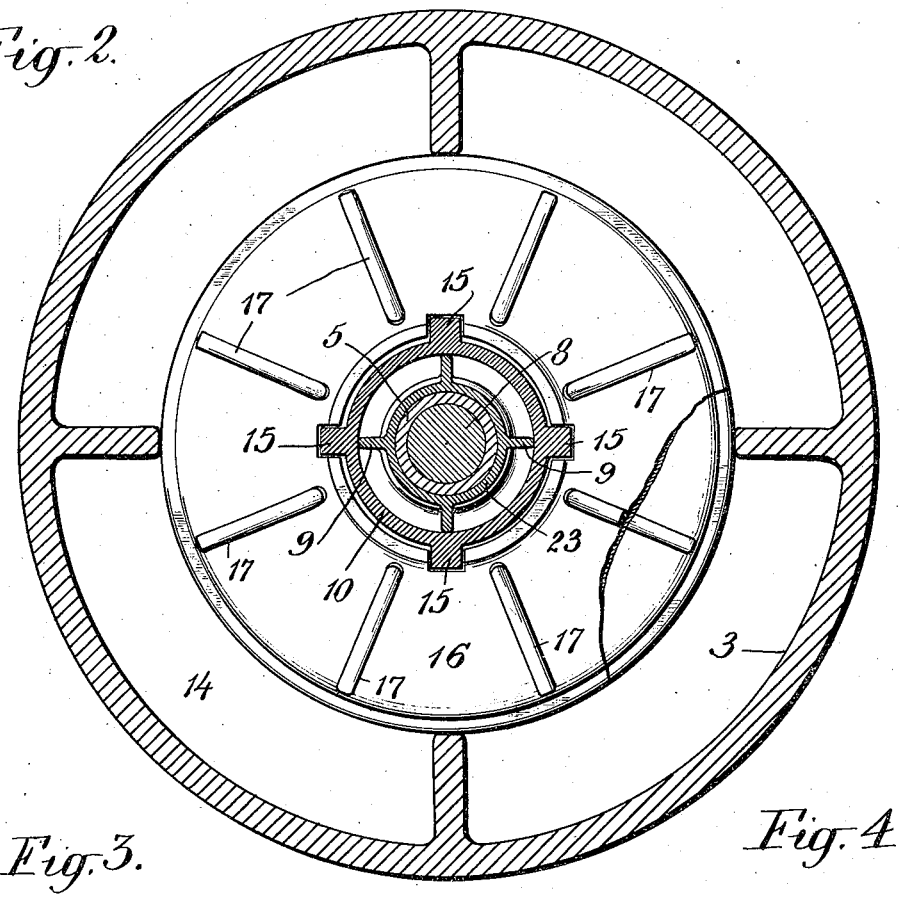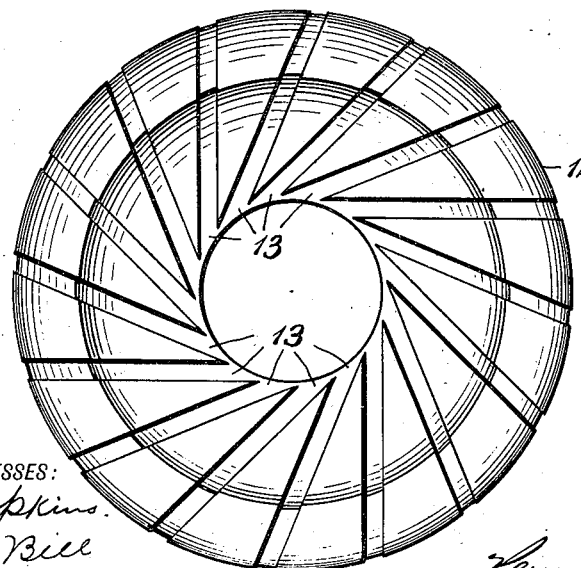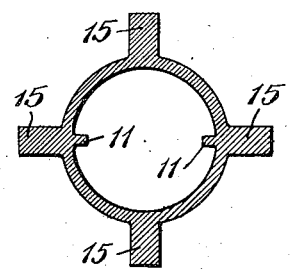

BERT R. WRIGHT, OF POUGHKEEPSIE, NEW YORK, ASSIGNOR TO THE DE LAVAL SEPARATOR COMPANY, OF NEW YORK, N. Y., A CORPORATION OF NEW JERSEY.

CLARIFICATION OF MILK.

1,122,457.   Specification of Letters Patent.   Patented Dec. 29, 1914.

Application filed July 21, 1913. Serial No. 780,326.

*To all whom it may concern:*

Be it known that I, BERT R. WRIGHT, a citizen of the United States, residing at Poughkeepsie, county of Dutchess, State of New York, have invented certain new and useful Improvements in Clarification of Milk; and I do hereby declare the following to be a full, clear, and exact description of the invention, such as will enable others skilled in the art to which it appertains to make and use the same.

This invention relates to the centrifugal clarification of milk and has for its object the removal of the objectionable matter, such as inflammatory discharges, dirt, and other inherent and foreign substances, which are commonly found in milk, (whether in the milk as it comes from the cow or gotten into it through milking or in handling), without separating or otherwise affecting the normal distribution of the butter-fat globules in the milk and their relation to the other milk constituents; so that the resultant product of the operation shall be milk, containing its normal content of butter-fat normally distributed therethrough, practically devoid of solid impurities and other objectionable matter, with a substantial reduction in bacterial content and a diminished tendency to bacterial development, particularly of harmful character.

The invention herein described is essentially different and in certain important respects substantially the reverse of the operations practised in any previously attempted centrifugal clarification of milk.

Heretofore all efforts to centrifugally clarify milk have, by reason of the construction employed, necessarily involved separation, to at least a considerable degree, of the so-called cream and skim-milk or heavier and lighter parts of the milk, and the remixing of the cream and skim-milk. In such circumstances the remixing of the butter-fat globules and other parts of milk is not uniform, and where the butter-fat globules have been once partially separated and brought together more or less in clusters, by which their relative buoyancy to the other parts of milk is increased, they thereafter rise more freely and separate more completely from the other parts of milk than they would naturally, so that in the case of milk of which the clarification has been attempted in such manner and which is then placed in cans or bottles the cream rises differently and presents a different appearance than ordinarily in the case of unclarified milk. The cream at the top of the can or bottle will be denser and of less bulk or quantity. The line of demarcation between the cream and skim-milk is more clearly defined and the skim-milk is bluer and more watery in appearance, which conditions make an unfavorable impression on the average buyer and constitute serious commercial disadvantages in the marketing of the milk. These difficulties heretofore have been mainly due to the employment of types of construction primarily intended for centrifugal cream separation, which construction not only permitted but facilitated and was primarily designed to accomplish the separation of the heavier and lighter fluid parts of the milk, and with which the degree of clarification possible with such a bowl has been merely an incidental result.

In the present invention it has been recognized that it is quite as important to prevent separation as to effect clarification, and these may be said to be its two-fold and parallel purposes, though each is accomplished substantially independent of the other, that is clarification without separation and clarification more completely than ever before.

In the case of all previous types of construction the delivery of the milk into the free space of the bowl has been at a point not near enough to the periphery to subject all of it to a maximum, or sufficient, degree of centrifugal force for complete clarification, since the movement of the lighter parts of the milk from such point of delivery to the free space of the bowl has been at once inward toward the center, or to the line of discharge from the bowl. At the same time, with such construction, where more or less separation of the heavier and lighter parts of milk necessarily occurs, the movement of the heavier fluid parts is outward in the same direction as the objectionable matter of which it is desired to clarify it, which removal is rendered more difficult by the course of each being in the same direction, as well as by the fact that the heavier parts of milk being of more nearly like specific gravity to the dirt and other foreign matter this heavier liquid is not as easily clarified as would be the whole milk and much of the impure matter is not removed from it. Again, where construction of the ordinary cream separator type has been employed in clarification the dirt or objectionable matter holding space at the periphery is always limited in depth and the construction of the bowl throughout is necessarily of such character that after a comparatively short duration of run much of the matter that may once have been removed from the milk and deposited against the periphery is again caught up and carried off by the rapidly moving currents of heavier or skim-milk parts, first outward toward the periphery and then upward or downward through the peripheral space to the point of discharge.

In the operation of the apparatus herein described the movement of the whole milk, both its lighter and heavier fluid parts, is always in one direction, whatever this may be, and so controlled as to afford no opportunity for division or separation, while at the same time, as has been said, the whole milk is subject to the maximum degree of centrifugal clarifying force. The movement of the whole milk from the central inlet chamber is first outward to the annular near-peripheral space, through restricted passages and at such velocity as to prevent separation. The full mass of milk is subjected to the clarifying force in this near to the periphery annular space, the depth of which is ample to permit of the deposit of all matter of which the milk may be clarified. Thence the movement of the whole milk is inward toward the center of the bowl, and the inward movement controlled by the use of a disk liner or equivalent means of dividing the milk into thin sheets, which at the same time completes its clarification, the movement of the matter of which it may be thus further clarified being outward to the periphery or the reverse of the milk flow.

If in the inward movement of the milk between the disks or other means of dividing it into thin sheets there is a conceivable tendency for the butter-fat globules or lighter parts to travel fasten than the heavier parts of the liquid, or rather of the heavier portion to lag behind the lighter portion, one measure of butter-fat globules or lighter portion of liquid merely replaces another such lighter portion in a heavier portion, without changing the relative distribution of butter-fat globules or the normal proportion of the lighter and heavier parts of the milk, and entirely without separation of them.

Many experiments as well as much practical use of my invention have demonstrated that there is no discernible change in the distribution of butter-fat globules in the clarified milk product resulting from its use, nor tendency of the butter-fat globules to rise more quickly or differently than would be the case if the milk were not subjected to the clarifying process. Hence by the use of my invention the necessary practical conditions are realized for obtaining a maximum centrifugally clarifying action on milk without any substantial disturbance of the normal relationship existing between the butter-fat globules and other milk parts or constituents, and the clarified milk cannot be distinguished from that which has not been centrifugalized, except for its desired freedom from sediment, objectionable foreign matter and lessened bacterial content, which latter consideration, especially as regards harmful and disease breeding bacteria, the experiments thus far made and now proceeding indicate to be of very great importance.

In the accompanying drawings,—Figure 1 represents, in section, a clarifier adapted for the practice of the invention; the outer casing being shown as broken away; Fig. 2 represents a section on a plane indicated by the line 2—2 of Fig. 1; Fig. 3 represents a bottom plan view of the feed sleeve constituting one of the elements of the clarifier; Fig. 4 represents a section on a plane indicated by the line 4—4 of Fig. 1.

Similar numerals of reference indicate similar parts throughout the several views.

Referring to the drawings, 1 represents the outer stationary casing of the clarifier, having the customary pedestal 2. The bowl of the clarifier consists of an outer shell 3, having an upwardly projecting frusto-conical bottom 4, and a hollow taper stem 5, with a conical top, said stem rising from the center of the bottom. The cavity of the stem is hemispherical at its upper end and is provided with a cross pin 6. The pin fits within and engages a slot 7 in the hemispherical upper end of a shaft 8, which supports and carries the bowl. On the outside of the stem 5 is a sleeve 23 provided with ribs 9 having channels between them.

Surrounding the sleeve 23 and guided by the ribs 9 is a sleeve 10 which extends upwardly to the top of the bowl and forms a central inlet chamber, within which are vertical ribs 11. This sleeve also has a downward extension 12 surrounding the upper portion of the frusto-conical bottom 4 of the bowl. In the underside of this downward extension 12 of the sleeve are restricted passages 13, tangential to the lower part of the central inlet chamber of the sleeve. The lower outer ends of these passages 13 open directly into the peripheral space 14. The tubular portion of the sleeve has outer ribs 15 between which are channels for the upward flow of the liquid toward the discharge from the bowl.

Guided by the ribs 15 is a series of frusto-conical disks 16, which have radial ribs 17 on their upper sides to space them the proper distance apart. The bottom disk of the series is provided further with ribs on its lower side, to space it at a proper distance from the conical downward extension 12 on which it rests.

The top 18 of the bowl rests on the uppermost disk of the series and, when drawn to the shell 3 by means of the coupling ring 19, serves to clamp all of the disks together, forcing them down on top of the sleeve extension 12, and, in turn, holds the sleeve against the frusto-conical bottom of the bowl.

It will be noted that the maximum diameter of the sleeve-extension as well as that of the disks is considerably less than the inside diameter of the bowl, thus leaving an ample peripheral clarifying and slime-holding space 14. A rubber ring 20, which, when the top 18 is drawn down by the coupling ring 19, is tightly clamped between the top and the shell, serves to prevent leakage. A nut 21 when screwed down against a shoulder on the sleeve 10, leaves between it and the neck 22, a discharge orifice for the clarified liquid.

The milk to be clarified is fed to a cup, not shown, above the machine, and passes through a feed tube extending downward within the upper portion of the sleeve 10. The stream from this tube strikes the conical top of the stem 5 and is deflected outward against the inside of the sleeve where it is caught by the ribs 11 and is caused to rotate with the bowl. It then passes at high velocity downward through the channels between the ribs 9 and outward through the restricted channels 13 to the peripheral space 14, where all of the liquid is subjected to the maximum centrifugal force. From the peripheral space 14, the liquid enters the narrow passages left between the disks 16 by the ribs 17 on said disks, and traverses them to the channels between the ribs 15 on the central sleeve 10, through which channels it passes upwardly to the discharge orifice over the neck 22 of the bowl top 18.

The central inlet or milk-receiving and distributing chamber lies within the discharge from the bowl, so that there is no tendency or opportunity for separation of the butter fat from the milk in said chamber, nor can either of the liquid constituents lag in the restricted passages leading therefrom.

It will, of course, be understood that the clarifier is to be driven at the high velocity customary in centrifugalizing milk, varying, as is well known, according to the diameter of bowl or revolving vessel employed. In establishing the cross-sectional area of the channels leading outwardly from the central inlet chamber to the annular peripheral space, the manufacturer will naturally be guided by the consideration that the passages must be so restricted as to afford sufficient velocity of the milk passing through them to avoid separation of the butter globubles from the other parts of the milk. The annular peripheral space should be of such relative size, as indicated for instance in the drawings, as to provide ample room for the deposit and accumulation of the matter removed from the milk.

It will be understood that in this specification, in referring to the product to be clarified as milk, I intend the term to be construed in its generic sense, that is to say as an emulsion wherein the proportion of butter fat globules present as one of the constitutents of the compound fluid may vary within wide limits,—the purpose being to pass through the machine the milk fluids of different specific gravities and to deliver them therefrom clarified and unseparated in whatever proportions they may be combined as subjected to clarification.

Having thus described my invention, what I claim is:

1. The method of clarifying milk, which comprises propelling the liquid from the center of a revolving bowl to a peripheral space where impurities heavier than milk are deposited, and thence inwardly toward the center of the bowl and point of discharge therefrom, and restricting the flow of the milk to and from the peripheral space to streams of small cross-sectional area, whereby clarification is effected and separation of the heavier and lighter liquid constituents of the milk is prevented; substantially as described.

2. The method of clarifying milk, which comprises delivering the milk centrally within a revolving bowl, restricting the flow of the milk toward the periphery to streams of small cross-sectional area, conducting the milk through a peripheral space, where impurities heavier than milk are deposited, and then directing the flow of the milk toward the axis of the bowl in multiple thin sheet-like streams, and thence to a discharge, whereby clarification is effected and separation of the heavier and lighter liquid constituents of the milk is prevented; substantially as described.

3. The method of clarifying milk, which comprises delivering the milk centrally within a revolving bowl, restricting the flow of the milk toward the periphery to streams of small cross-sectional area, conducting the milk through a peripheral space, where impurities heavier than milk are deposited, and then directing the flow of the milk toward the axis of the bowl in multiple thin radially subdivided sheet-like streams, and thence to a discharge, whereby clarification is effected and separation of the heavier and lighter liquid constituents of the milk is prevented; substantially as described.

4. The method of clarifying milk, which comprises propelling the milk from the center of a revolving bowl to a peripheral space where impurities heavier than milk are deposited and thence inwardly toward the center of the bowl and port of discharge therefrom, and causing the heavier and lighter liquid constituents of the milk to move in the same direction both outwardly toward the peripheral space and inwardly therefrom to the port of discharge at such rate and volume of current flow as to deliver the milk from the bowl without substantially changing the distribution of the butter fat globules therein; substantially as described.

5. A centrifugal milk clarifier, comprising a rotating bowl having a centrally disposed inlet consisting of a milk-receiving and distributing chamber lying within the discharge from the bowl and having restricted passages leading therefrom to an annular peripheral clarifying and dirt-holding space, where impurities heavier than milk are deposited, means for directing the flow of the milk from the peripheral space toward the center of the bowl in streams of small cross-sectional area, and a discharge outlet for the milk; substantially as described.

6. A centrifugal milk clarifier, comprising a rotating bowl having a centrally disposed inlet consisting of a milk - receiving and distributing chamber lying within the discharge from the bowl and having restricted passages leading therefrom to an annular peripheral clarifying and dirt-holding space, where impurities heavier than milk are deposited, means for directing the flow of the milk from the peripheral space toward the center of the bowl in multiple thin sheet-like streams, and a discharge outlet for the milk; substantially as described.

7. A centrifugal milk clarifier comprising a rotating bowl having a centrally disposed inlet consisting of a milk-receiving and distributing chamber lying within the discharge from the bowl and having restricted passages leading therefrom to an annular peripheral clarifying and dirt-holding space, where impurities heavier than milk are deposited, means for directing the flow of the milk from the peripheral space toward the center of the bowl in multiple thin radially sub-divided sheet-like streams, and a discharge outlet for the milk; substantially as described.

8. A centrifugal milk clarifier, comprising a rotating bowl having a centrally disposed inlet consisting of a milk-receiving and distributing chamber lying within the discharge from the bowl and having restricted passages leading rearwardly therefrom to an annular peripheral clarifying and dirt-holding space where impurities heavier than milk are deposited, means for directing the flow of the milk from the peripheral space toward the center of the bowl in streams of small cross-sectional area, and a discharge outlet for the milk, substantially as described.

In testimony whereof I affix my signature, in presence of two witnesses.

BERT R. WRIGHT.

Witnesses:
S. B. ROCKEFELLER,
W. A. HUBBARD.